Sept. 4, 1951 H. F. FLOWERS 2,566,322
WHEEL MOUNTING FOR AXLELESS TRUCKS
Filed Nov. 5, 1946 2 Sheets-Sheet 1

INVENTOR.
Henry Fort Flowers
BY
Mason, Porter, Diller
and Stewart ATTYS.

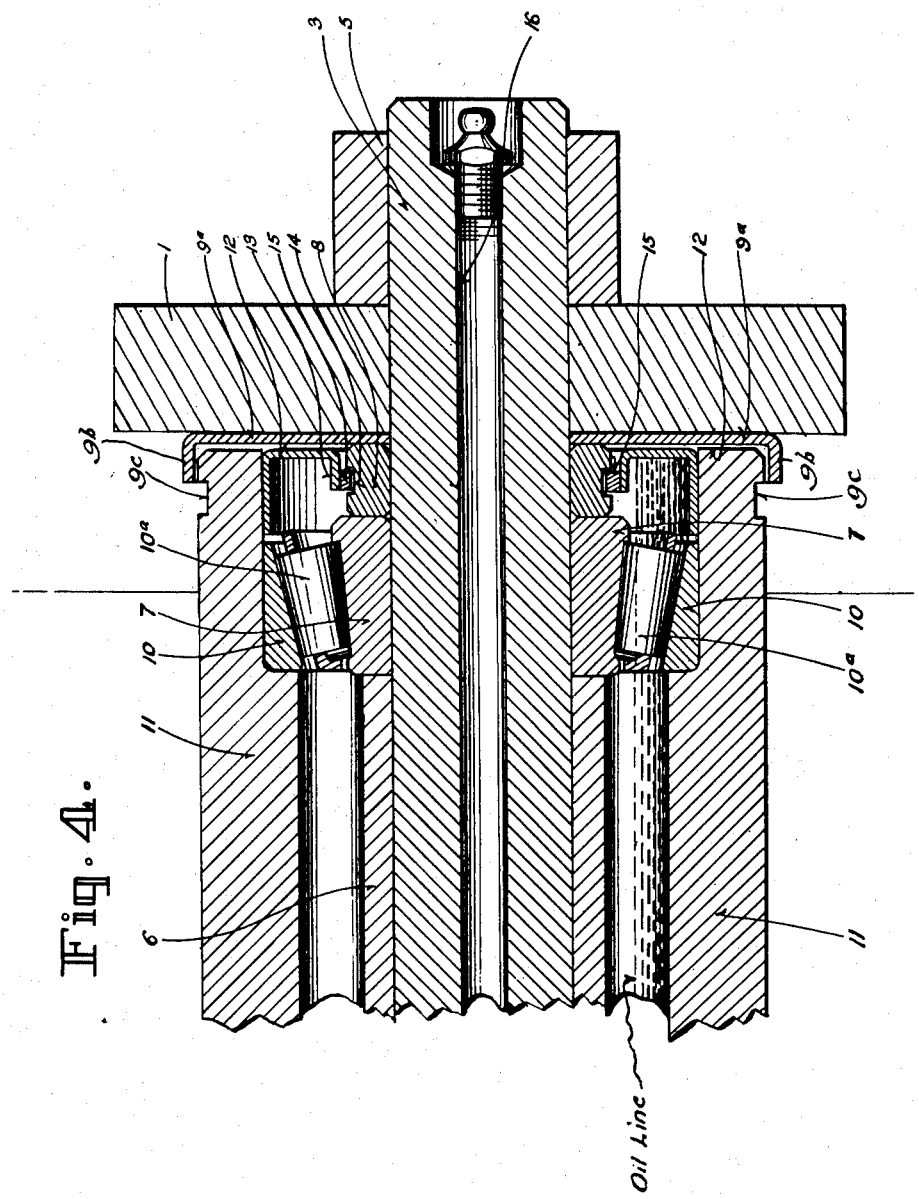

Patented Sept. 4, 1951

2,566,322

UNITED STATES PATENT OFFICE 2,566,322

WHEEL MOUNTING FOR AXLELESS TRUCKS

Henry Fort Flowers, Findlay, Ohio

Application November 5, 1946, Serial No. 707,822
In Great Britain November 7, 1945

3 Claims. (Cl. 308—187.1)

The invention relates to new and useful improvements in a wheel mounting for axleless trucks, which wheel mounting is so constructed as to provide an efficient lubrication for the bearings of the wheel.

In my co-pending application, Serial No. 707,821, filed November 5, 1946, there is shown and described a wheel mounting for an axleless truck wherein an oil bath is maintained within the hub of the wheel and so disposed that the movable parts of the bearings for the wheel dip into the oil bath during each rotation of the wheel. This oil bath is maintained in the hub of the wheel by oil retaining members mounted at the ends of the hub and having an oil sealed running fit with a stationary spacer sleeve carried by the spindle on which the wheel is mounted.

An object of the invention is to provide a wheel mounting of the above type with means for preventing dust from working into contact with the oil seals at the ends of the hub.

A further object of the invention is to provide a wheel mounting of the above type wherein a dust guard is mounted at each end of the spindle carrying the wheel, which dust guards are provided with flanges having a running fit with the hub of the wheel.

These and other objects will in part be obvious and will in part be hereinafter more fully described.

In the drawings:

Figure 4 is a view similar to Figure 2 but showing a slightly modified form of dust guard.

Figure 1:
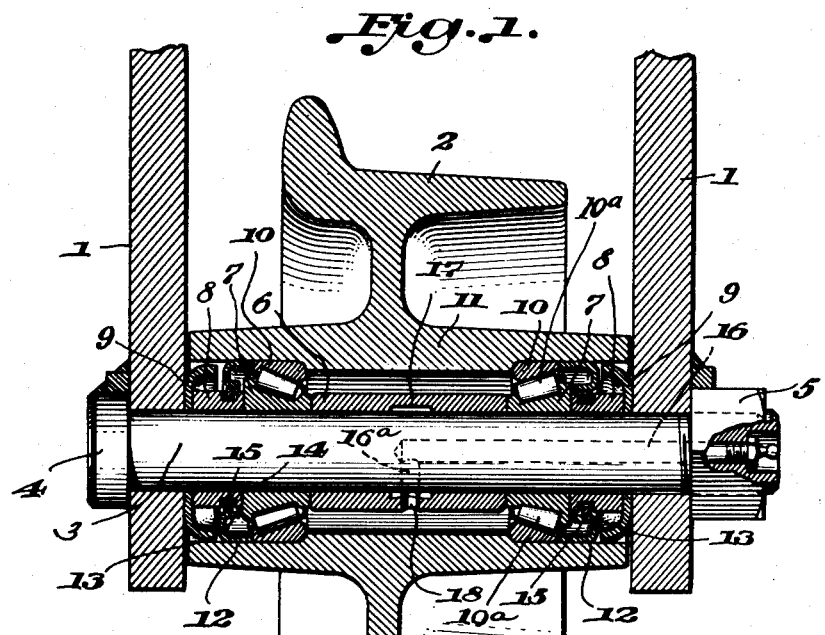
Figure 1 is a horizontal section through an end portion of an axleless truck and through the wheel and the mounting thereof.

The axleless truck shown in my co-pending application includes spaced side members formed of heavy plates. These side members are connected by angle plates and semi-cylindrical gimbal supporting plates, all of which are welded to the side members so as to provide a very rigid wheel frame structure. Only the end portions of the side frames and one of the wheels and the mounting therefore are shown in the present application. The side frame members are indicated at 1, 1 and the wheel which is mounted between these side frame members is indicated at 2. A spindle 3 passes through the side members and centrally through the hub of the wheel. This spindle is provided with a head 4 at the one outer end and a nut 5 at the other outer end.

The head and the nut make contact with the outer faces of the side frame members. Mounted on this spindle is a center spacer sleeve 6 and at the ends of this spacer sleeve are the inner races 7, 7 of the bearings for the wheel. There are outer spacer sleeves 8, 8 mounted on the spindle. The outer races 10, 10 of the bearings are mounted in the hub 11 of the wheel. Between the inner and outer races are tapered rollers 10ª, 10ª of the usual construction.

A U-shaped oil retainer 12 is press fitted into each end of the hub outside of the outer race of each bearing and rotates with the hub. This oil seal retainer is preferably stamped from mild steel. There is an oil retainer at each end of the hub and the inner flange 13 thereof is spaced away from the sleeve 8 with which it is associated. The sleeve 8 is provided with an annular groove 14, the side walls of which are parallel. A snap ring 15 is placed within the flange 13 of the oil retainer and frictionally grips the same so as to turn with the oil retainer. This snap ring can center itself in the groove and is so dimensioned that it does not contact with the side walls or bottom of the groove. However, it is so closely spaced relative to these walls as to provide a running fit oil seal, preventing oil from escaping past this ring. Lubricating oil is supplied to the hub through a central passage 16 in the spindle. A radial port 16ª leads to an annular space 17 in the center spacing sleeve 6 and ports 18 lead from this annular space to the chamber within the hub between the center spacer sleeve and the inner face of the hub. This chamber within the hub is provided with a quantity of lubricant, preferably oil, so as to provide an oil level indicated in Figures 2 and 4. This oil level is so disposed that as the wheel rotates the movable parts of the bearings and in particular the rollers will dip into the bath and thus the bearings are lubricated. The level of the oil bath is also so disposed that the running fit between the snap ring and the groove and the spacer sleeve is above the oil level when the wheel is stationary and this prevents any possible leakage of oil through this running fit. The snap ring is so closely spaced relative to the walls of the groove that it serves as an oil seal, at all times preventing oil from escaping from the chamber in the hub. The snap ring is divided and the ends 19, 19 are slightly spaced from each other and preferably beveled, as shown at 20ª, 20ᵃ in Figure 3. This is the position of the ends after the snap ring has been forced into the flange of the oil retainer 12. When in position, the space between the ends is only sufficiently large to permit breathing or the necessary relief to avoid undue pressure within the chamber of the wheel hub. The oil would, of course, pass through the bearings to the outer side thereof but will be retained by the oil retainer 12.

Figure 2:
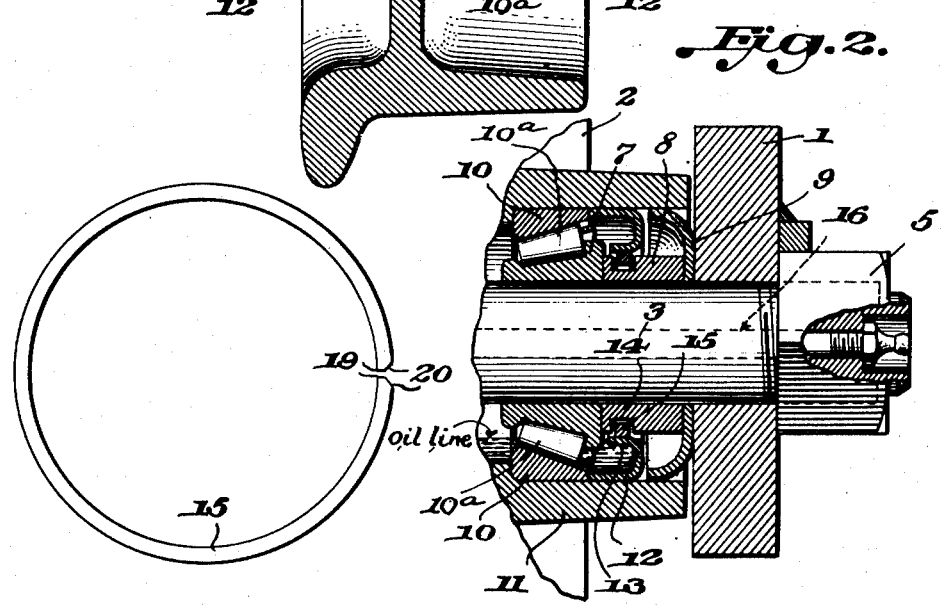
Figure 2 is an enlarged vertical sectional view through one end of the wheel mounting and the side frame member associated therewith.
Figure 3:
Figure 3 is a side view of a snap ring showing the ring as divided and having the ends thereof slightly spaced.

Disposed between the spacer sleeve 8 and the truck frame member 1 is a dust guard 9. This dust guard fits onto the spindle. There is a dust guard at each end of the hub and when the nut 5 is tightened, the side members of the frame will be pressed against the dust guard, the dust guards against the spacer sleeve, the inner races of the bearings and the center sleeve, thus forming a very rigid mounting for the wheel and a rigid support for the dust guards. As shown in Figures 1 and 2, the dust guard is curved inwardly so as to be brought into close running contact with the inner surface of the hub of the wheel. This will prevent dust from working between the ends of the hub and the side frame members and coming into contact with the oil seal. In Figure 4 the dust guard indicated at 9ᵃ is shown as extending to the outer face of the hub. This dust guard is clamped between the frame and the outer spacing sleeves in the manner described above in connection with the dust guard 9. The dust guard 9ᵃ at its outer end is provided with an inwardly projecting flange 9ᵇ which overlaps and makes running fit with the outer face of the hub. An annular groove 9ᶜ is formed in the hub right at the inner end of the flange and any dust accumulating on the hub will collect in the groove and will not work in between the flange 9ᵇ and the hub.

While the drawings show the bearings provided with rollers, it will be understood that balls may be used in place of the rollers.

It is obvious that minor changes in the details of construction may be made without departing from the spirit of the invention as set forth in the appended claims.

I claim:

1. In a wheel mounting for trucks having a supporting spindle, a wheel the hub of which is mounted on bearings carried by said spindle, and spacer sleeves for positioning the bearings on the spindle, the combination of an oil seal mounted in the hub at each end thereof including an annular groove in the outer spacer sleeve and means within the hub and rotating therewith adapted to extend into the associated groove for retaining an oil bath within the hub, dust guards mounted on said spindle outside of the outer spacer sleeves, and means connected to the spindle for clamping the dust guards against the spacer sleeves, each dust guard having a flange at its outer edge contacting the hub and closing the open ends of the hub for preventing dust from working into and through the oil seal.

2. In a wheel mounting for trucks having a supporting spindle, a wheel the hub of which is mounted on bearings carried by said spindle, and spacer sleeves for positioning the bearings on the spindle, the combination of an oil seal mounted in the hub at each end thereof including an annular groove in the outer spacer sleeve, and an oil retainer mounted in said hub and rotatable therewith, said oil retainer having an inner cylindrical flange, a split metal ring expanded into engagement with the flange and rotatable therewith, said ring being dimensioned so as to loosely fit in the groove in the associated outer sleeve and form and oil seal for retaining an oil bath within the hub, dust guards mounted on said spindle outside of the outer spacer sleeves and means connected to the spindle for clamping the dust guards against the spacer sleeves, said dust guards each having a flange at the outer edge thereof contacting with the inner surface of the hub and closing the open ends of the hub for preventing dust from working into and through the oil seal.

3. In a wheel mounting for trucks having a supporting spindle, a wheel the hub of which is mounted on bearings carried by said spindle, and spacer sleeves for positioning the bearings on the spindle, the combination of an oil seal mounted in the hub at each end thereof including an annular groove in the outer spacer sleeve and means within the hub and rotating therewith adapted to extend into the associated groove for retaining an oil bath within the hub, dust guards mounted on said spindle outside of the outer spacer sleeves, and means connected to the spindle for clamping the dust guards against the spacer sleeves, each dust guard having a flange at the outer edge thereof which flange overlies the hub and makes running contact therewith, said hub having a groove formed therein at the inner edge of the flange of the dust guard for preventing dust from working in between the flange and the hub.

HENRY FORT FLOWERS.

REFERENCES CITED

The following references are of record in the file of this patent:

UNITED STATES PATENTS

| Number | Name | Date |
| --- | --- | --- |
| 762,081 | McNulty | June 7, 1904 |
| 1,492,793 | Hansen | May 6, 1924 |
| 1,583,785 | Evans | May 11, 1926 |
| 1,793,190 | Philips | Feb. 17, 1931 |
| 1,959,697 | Tracy | May 22, 1934 |
| 2,032,464 | Berger | Mar. 3, 1936 |
| 2,045,026 | Rosendahl | June 23, 1936 |
| 2,094,251 | Young | Sept. 28, 1937 |
| 2,272,757 | Teker | Feb. 10, 1942 |
| 2,283,871 | Norelius | May 19, 1943 |
| 2,427,831 | Bennett | Sept. 23, 1947 |

FOREIGN PATENTS

| Number | Country | Date |
| --- | --- | --- |
| 640,766 | France | July 21, 1928 |